UNITED STATES PATENT OFFICE.

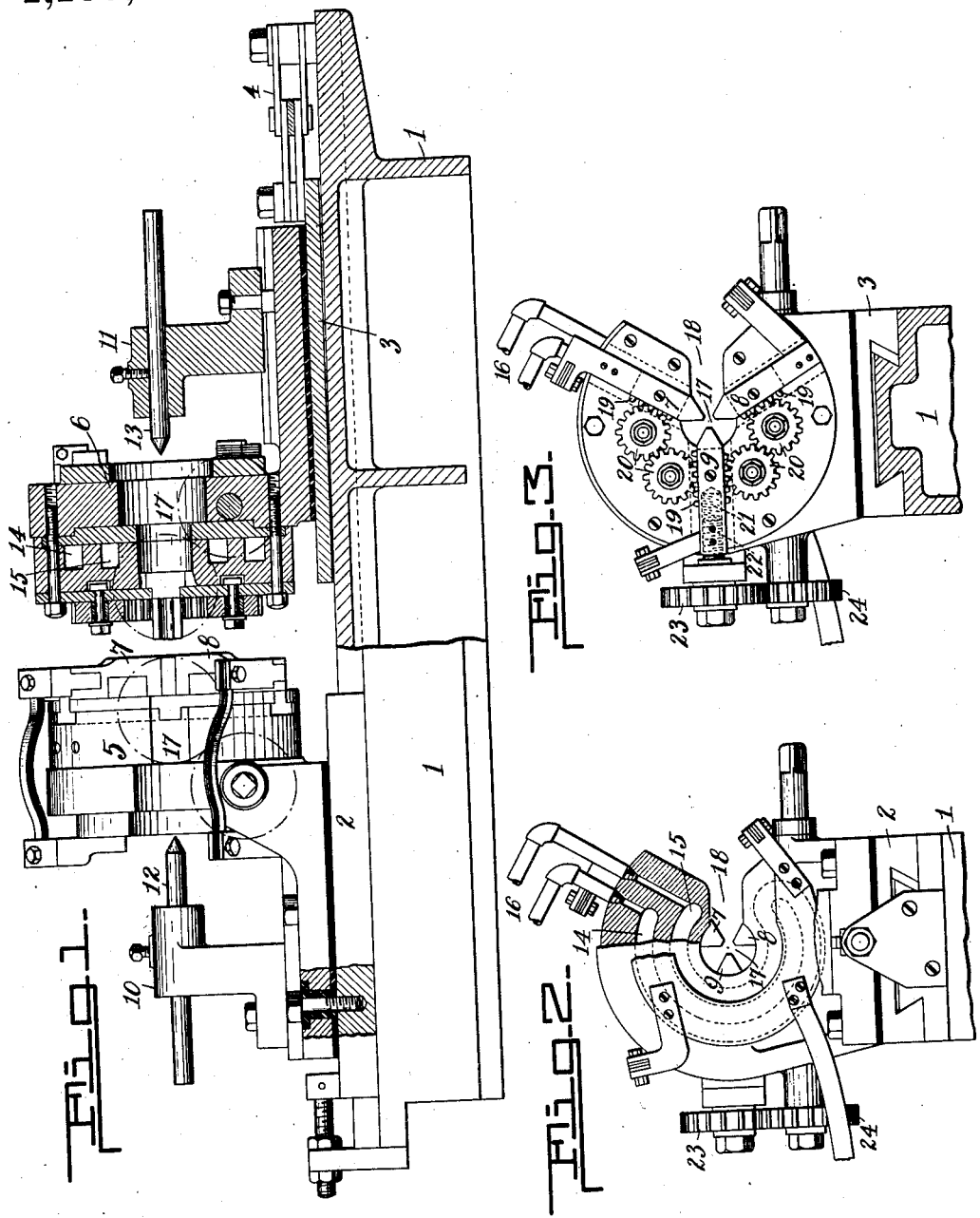

FRIEDERICH MÜLLER, OF HARTFORD, CONNECTICUT, ASSIGNOR TO PRATT & WHITNEY COMPANY, OF HARTFORD, CONNECTICUT, A CORPORATION OF NEW JERSEY.

CHUCKING DEVICE.

1,199,408.  Specification of Letters Patent.  Patented Sept. 26, 1916.

Application filed August 28, 1915. Serial No. 47,749.

*To all whom it may concern:*

Be it known that I, FRIEDERICH MÜLLER, a citizen of the United States, residing at Hartford, in the county of Hartford and State of Connecticut, have invented certain new and useful Improvements in Chucking Devices, of which the following is a full, clear, and exact description, such as will enable others skilled in the art to which it appertains to make and use the same.

This invention relates to chucking devices, and more particularly to an improved universal chuck capable of expeditious operation.

One of the objects of the invention is to provide a reliable and efficient chuck adapted to facilitate insertion and removal of work pieces.

Other objects and advantages will in part appear hereinafter in connection with the description of a typical embodiment of the invention illustrated in the accompanying drawing, wherein the device is shown incorporated in an electric welding apparatus.

In the drawing, Figure 1 is an elevational view, partially in section, of an apparatus embodying one form of my improved device; Fig. 2 is an end view, partially in section, on the line 2—2 of Fig. 1; and Fig. 3 is an end view on the line 3—3 of Fig. 1.

This application is directed to subject-matter set forth in my copending application, now Patent No. 1,151,706, issued August 31, 1915.

Referring generally to the apparatus represented in Fig. 1, there is provided a frame table 1, having slidable thereon a pair of carriages or supports 2 and 3 movable relatively toward and from each other by suitable means, such as linkage 4. The carriages 2 and 3 are provided at their adjacent ends with work holders 5 and 6, which, in the present instance, comprise contact members having gripping jaws in the form of electrodes 7, 8 and 9 to carry a welding current to the supported work pieces. Brackets 10 and 11 may also be mounted on the supports 2 and 3 respectively and provided with adjustable bars 12 and 13 to engage the outer extremities of the work pieces therebetween and apply longitudinal pressure thereto.

The work holders 5 and 6, as designed in the present embodiment, comprise a plurality of disks bolted together and provided with channels 14 and 15 communicating with pipes 16, by which a cooling fluid may be circulated in the work holders during the welding operation.

Each of the holders or chucks 5 and 6 is provided with a central or axial bore 17 and a lateral opening or passageway 18 communicating with the bore and through which work pieces may be laterally inserted or removed. The clamping jaws 7, 8 and 9 are disposed radially about the bore 17 and are slidably mounted in the chucks. These jaws, however, are adapted for simultaneous adjustment by inter-connections typically indicated as comprising rack teeth 19 and intermeshing pinions 20. One of the jaws, for example 9, is also provided with an internal threading 21 which receives a threaded stub shaft 22 rotatable by a pinion 23 intermeshing with a driving gear 24 operated from a suitable source.

It will be noted that the construction described is such that rotation of shaft 22 in one direction effects a withdrawal of clamping jaw 9, and through the intermeshing racks and pinions a simultaneous and co-equal withdrawal of the jaws 7 and 8. Similarly, operation of shaft 22 in the reverse direction effects simultaneous adjustment of the centering jaws inward to grip a work piece.

The lateral passageway 18 in the chucks is of a dimension to accommodate work pieces of various sizes for which the particular chuck is adapted. The clamping jaws 7, 8 and 9, while in the present instance constituting also welding electrodes, may be of other material designed to serve only as gripping or centering means. Similarly, while the chucks in the present instance are incorporated in an electric welding apparatus, it will be understood that they may be employed generally in various other relations without sacrifice of their meritorious features.

The operation of the chuck will be apparent from the foregoing description of the structure, but it is briefly noted that the holding jaws 7, 8 and 9 are adjusted radially outward to permit lateral insertion of a work piece through passage 18 into the bore 17, whereupon the jaws are moved inward to grip and at the same time center the work. It is to be observed also that the clamping jaws of the two chucks are independently operable to accommodate simultaneously work pieces of different diameters.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In a chucking device, in combination, a supporting member having a central bore and a lateral passageway communicating therewith, work jaws adjustably mounted on said support and having extremities projecting into said bore, and means to effect simultaneous adjustment of said jaws to prevent or permit lateral movement of a work piece through said passageway.

2. In a chucking device, in combination, a supporting member having a central bore and a lateral passageway communicating therewith, a plurality of centering and gripping jaws mounted on said support for radial adjustment with respect to said bore, and means to effect simultaneous adjustment of said jaws to prevent or permit lateral removal or insertion of a work piece through said passageway.

3. In a chucking device, in combination, a supporting member having a central bore and a lateral passageway communicating therewith, a plurality of work jaws adjustably mounted on said support and disposed symmetrically about said bore, and means including intermeshing racks and pinions to effect simultaneous adjustment of said jaws to prevent or permit lateral movement of a work piece through said passageway.

4. In a chucking device, in combination, a supporting member having a central bore and a lateral passageway communicating therewith, a plurality of radially disposed slidable work jaws mounted on said support, said jaws having rack teeth, intermeshing pinions mounted on said support and coöperating with said rack teeth for insuring simultaneous adjustment of said jaws to clear or constrict said passageway, and driving means for one of said jaws.

5. In chucking mechanism, in combination, a pair of supports movable toward and from each other, said supports having alined central openings and lateral passageways communicating therewith, gripping jaws mounted on each of said supports and adjustable relative to said central bores, means to effect adjustment of the jaws mounted on either support independently of the other, and means to insure simultaneous adjustment of all the jaws on either support.

In testimony whereof I affix my signature, in the presence of two witnesses.

FRIEDERICH MÜLLER.

Witnesses:
W. N. STORRS,
W. R. MULLER.